(12) United States Patent
Koum et al.

(10) Patent No.: US 10,225,399 B2
(45) Date of Patent: Mar. 5, 2019

(54) MOBILE DEVICE STATUS AND NOTIFICATION

(71) Applicant: WhatsApp Inc., Mountain View, CA (US)

(72) Inventors: Jan Koum, Santa Clara, CA (US); Brian Acton, Mountain View, CA (US)

(73) Assignee: WhatsApp Inc., Menlo Park, CA (US)

( * ) Notice: Subject to any disclaimer, the term of this patent is extended or adjusted under 35 U.S.C. 154(b) by 0 days.

(21) Appl. No.: 15/582,365

(22) Filed: Apr. 28, 2017

(65) Prior Publication Data

US 2017/0237854 A1 Aug. 17, 2017

Related U.S. Application Data

(63) Continuation of application No. 14/925,569, filed on Oct. 28, 2015, now Pat. No. 9,998,593, which is a
(Continued)

(51) Int. Cl.
*H04L 12/58* (2006.01)
*H04L 29/08* (2006.01)
(Continued)

(52) U.S. Cl.
CPC ........ *H04M 3/42374* (2013.01); *H04L 51/08* (2013.01); *H04L 51/10* (2013.01); *H04L 67/26* (2013.01); *H04M 1/66* (2013.01); *H04M 1/72583* (2013.01); *H04M 3/42* (2013.01); *H04M 3/42153* (2013.01); *H04M 3/42306* (2013.01); *H04M 3/42365* (2013.01); *H04M 3/42382* (2013.01); *H04W 4/12* (2013.01); *H04W 4/14* (2013.01); *H04W 8/183* (2013.01); *H04W 8/26* (2013.01); *H04W 12/06* (2013.01);
(Continued)

(58) Field of Classification Search
CPC .......... H04L 67/24; H04L 51/04; H04L 51/38
See application file for complete search history.

(56) References Cited

U.S. PATENT DOCUMENTS 6,295,458 B1 * 9/2001 Takahashi ....... H04M 1/274566
455/466
6,587,691 B1 7/2003 Granstam et al.
(Continued)

OTHER PUBLICATIONS

United States Office Action, U.S. Appl. No. 13/559,558, dated Jul. 28, 2016, thirty-four pages.
(Continued)

*Primary Examiner* — Dung Hong
(74) *Attorney, Agent, or Firm* — Fenwick & West LLP

(57) ABSTRACT

Aspects of the present invention confirm that a phone number is associated with a particular phone. The phone number is confirmed to be associated with the phone by causing the phone to transmit a verification message addressed to that phone number. Receipt by the phone of the verification message confirms that the number is associated with that phone. Another aspect of the invention concerns updating the status of phones in a status list of phone numbers on a phone by sending the status list and updated status of the phone to a network server. The server monitors the status of at least one of the phones in the status list and transmits that status to the phone, which updated status is then displayed in a display area of the phone.

17 Claims, 11 Drawing Sheets

Related U.S. Application Data continuation of application No. 12/732,202, filed on Mar. 26, 2010, now Pat. No. 9,203,960, which is a continuation of application No. 12/732,182, filed on Mar. 25, 2010, now Pat. No. 8,995,965.

(51) Int. Cl.
| | |
|---|---|
| *H04M 3/42* | (2006.01) |
| *H04M 1/66* | (2006.01) |
| *H04W 4/14* | (2009.01) |
| *H04W 8/26* | (2009.01) |
| *H04W 12/06* | (2009.01) |
| *H04W 12/10* | (2009.01) |
| *H04W 12/08* | (2009.01) |
| *H04M 1/725* | (2006.01) |
| *H04W 4/12* | (2009.01) |
| *H04W 8/18* | (2009.01) |
| *H04M 1/2745* | (2006.01) |
| *H04M 1/56* | (2006.01) |

(52) U.S. Cl.
CPC ............ *H04W 12/08* (2013.01); *H04W 12/10* (2013.01); *H04M 1/2745* (2013.01); *H04M 1/56* (2013.01)

(56) References Cited

U.S. PATENT DOCUMENTS

| | | | |
|---|---|---|---|
| 6,714,799 B1 | 3/2004 | Park et al. | |
| 7,120,455 B1 | 10/2006 | Chen et al. | |
| 7,177,872 B2 | 2/2007 | Schwesig et al. | |
| 7,197,324 B2* | 3/2007 | Sweeney | H04L 51/38 455/414.3 |
| 7,260,207 B2 | 8/2007 | Marsico | |
| 7,496,349 B1 | 2/2009 | Gailloux et al. | |
| 7,502,339 B1 | 3/2009 | Pirkola et al. | |
| 7,738,833 B2 | 6/2010 | Bettis et al. | |
| 7,889,849 B2 | 2/2011 | Chatterjee et al. | |
| 8,169,409 B2 | 5/2012 | Castagnet | |
| 8,249,572 B2 | 8/2012 | Shanahan | |
| 8,285,312 B2* | 10/2012 | Rybak | G06Q 10/10 455/229 |
| 8,412,240 B2 | 4/2013 | Bhatt et al. | |
| 8,510,661 B2 | 8/2013 | Dharmaji et al. | |
| 9,680,803 B2 | 6/2017 | Moshir et al. | |
| 2002/0188714 A1* | 12/2002 | Bouthors | H04L 67/22 709/223 |
| 2003/0065788 A1* | 4/2003 | Salomaki | H04L 29/06 709/227 |
| 2003/0080183 A1 | 5/2003 | Rajasekaran et al. | |
| 2003/0109272 A1 | 6/2003 | Mousseau et al. | |
| 2004/0003037 A1* | 1/2004 | Fujimoto | G06Q 10/107 709/203 |
| 2004/0156495 A1 | 8/2004 | Chava et al. | |
| 2004/0193683 A1 | 9/2004 | Blumofe | |
| 2004/0215723 A1 | 10/2004 | Chadha | |
| 2005/0064852 A1 | 3/2005 | Baldursson | |
| 2005/0086376 A1 | 4/2005 | Park et al. | |
| 2005/0102381 A1 | 5/2005 | Jiang et al. | |
| 2005/0108550 A1 | 5/2005 | Stelzl | |
| 2005/0157857 A1 | 7/2005 | Lockwood | |
| 2005/0197141 A1 | 9/2005 | Jiang et al. | |
| 2006/0165060 A1 | 7/2006 | Dua | |
| 2006/0224688 A1* | 10/2006 | Morris | H04L 63/0236 709/217 |
| 2006/0262917 A1 | 11/2006 | Marsico | |
| 2006/0280166 A1* | 12/2006 | Morris | H04L 67/24 370/352 |
| 2007/0082671 A1* | 4/2007 | Feng | H04W 36/0016 455/436 |
| 2007/0233859 A1 | 10/2007 | Zhao et al. | |
| 2007/0238472 A1 | 10/2007 | Wanless | |
| 2007/0249375 A1 | 10/2007 | Zapata et al. | |
| 2007/0253340 A1 | 11/2007 | Varney et al. | |
| 2007/0281607 A1* | 12/2007 | Bucher | H04L 29/12103 455/3.06 |
| 2007/0281668 A1 | 12/2007 | Fleming | |
| 2008/0020707 A1 | 1/2008 | Takayama et al. | |
| 2008/0020738 A1 | 1/2008 | Ho et al. | |
| 2008/0090598 A1* | 4/2008 | Fanelli | H04L 51/04 455/466 |
| 2008/0126145 A1 | 5/2008 | Rackley, III et al. | |
| 2008/0167083 A1 | 7/2008 | Wyld et al. | |
| 2008/0182548 A1 | 7/2008 | Pattison et al. | |
| 2008/0189293 A1* | 8/2008 | Strandel | G06Q 10/107 |
| 2008/0209213 A1 | 8/2008 | Astrand et al. | |
| 2008/0248815 A1 | 10/2008 | Busch | |
| 2008/0292092 A1 | 11/2008 | La Porte et al. | |
| 2008/0313083 A1 | 12/2008 | Altberg et al. | |
| 2008/0313329 A1* | 12/2008 | Wang | G06Q 10/10 709/224 |
| 2009/0006613 A1 | 1/2009 | Toutain et al. | |
| 2009/0013087 A1 | 1/2009 | Lorch et al. | |
| 2009/0019532 A1 | 1/2009 | Jacobsen et al. | |
| 2009/0049087 A1* | 2/2009 | Cackowski | H04L 29/12594 |
| 2009/0104934 A1 | 4/2009 | Jeong et al. | |
| 2009/0106437 A1* | 4/2009 | Mostafa | H04L 29/12594 709/230 |
| 2009/0131022 A1 | 5/2009 | Buckley et al. | |
| 2009/0147778 A1 | 6/2009 | Wanless et al. | |
| 2009/0186638 A1* | 7/2009 | Yim | H04L 51/04 455/466 |
| 2009/0221310 A1 | 9/2009 | Chen et al. | |
| 2009/0234927 A1* | 9/2009 | Buzescu | H04W 8/22 709/206 |
| 2009/0275314 A1* | 11/2009 | Cotevino | H04L 51/043 455/414.2 |
| 2009/0286560 A1 | 11/2009 | Willis | |
| 2009/0288114 A1 | 11/2009 | Masuda | |
| 2010/0004014 A1 | 1/2010 | Coulombe | |
| 2010/0094976 A1 | 4/2010 | Kanefsky et al. | |
| 2010/0105358 A1* | 4/2010 | Imashimizu | H04L 51/043 455/412.1 |
| 2010/0135477 A1 | 6/2010 | Chen | |
| 2010/0149975 A1* | 6/2010 | Tripathi | H04L 67/04 370/230.1 |
| 2010/0151891 A1 | 6/2010 | Coelho | |
| 2010/0161638 A1* | 6/2010 | Macrae | G06F 17/30864 707/759 |
| 2010/0190478 A1 | 7/2010 | Brewer et al. | |
| 2010/0281169 A1 | 11/2010 | Charles | |
| 2010/0291904 A1 | 11/2010 | Musfeldt et al. | |
| 2010/0331021 A1 | 12/2010 | Bushnell | |
| 2011/0039584 A1* | 2/2011 | Merrett | H04L 51/36 455/466 |
| 2011/0059727 A1* | 3/2011 | Lisboa | H04W 4/00 455/414.1 |
| 2011/0070890 A1 | 3/2011 | Wu | |
| 2011/0072086 A1 | 3/2011 | Newsome et al. | |
| 2011/0072099 A1 | 3/2011 | Harju et al. | |
| 2011/0106910 A1 | 5/2011 | Grasset | |
| 2011/0264747 A1 | 10/2011 | Mutikainen et al. | |
| 2012/0253937 A1 | 10/2012 | Wing et al. | |
| 2014/0040383 A1* | 2/2014 | Dura | G06F 9/543 709/206 |
| 2015/0236989 A1* | 8/2015 | Shimamura | H04L 51/043 709/203 |
| 2016/0366076 A1* | 12/2016 | Agulnik | H04L 67/24 |

OTHER PUBLICATIONS

United States Office Action, U.S. Appl. No. 13/559,558, dated Nov. 19, 2015, thirty-two pages.
United States Advisory Action, U.S. Appl. No. 13/559,558, dated Sep. 22, 2015, three pages.
United States Office Action, U.S. Appl. No. 13/559,558, dated May 22, 2015, thirty-two pages.
United States Office Action, U.S. Appl. No. 13/559,558, dated Oct. 1, 2014, thirty pages.

(56) References Cited

OTHER PUBLICATIONS

United States Office Action, U.S. Appl. No. 14/925,569, dated May 19, 2017, seventeen pages.
United States Office Action, U.S. Appl. No. 14/925,569, dated Oct. 27, 2016, twenty-one pages.
United States Office Action, U.S. Appl. No. 14/925,569, dated Oct. 5, 2017, twenty pages.
United States Office Action, U.S. Appl. No. 15/482,984, dated Dec. 15, 2017, twenty-three pages.
United States Office Action, U.S. Appl. No. 15/482,984, dated Jul. 13, 2017, twenty-three pages.

* cited by examiner

MOBILE DEVICE STATUS AND NOTIFICATION

CROSS-REFERENCE TO RELATED APPLICATION

This application is a continuation of U.S. application Ser. No. 14/925,569, filed Oct. 28, 2015, which is a continuation of U.S. application Ser. No. 12/732,202 filed Mar. 26, 2010, which is a continuation of U.S. application Ser. No. 12/732,182 filed Mar. 25, 2010. Each application is incorporated by reference herein in its entirety.

BACKGROUND

Widespread use of wireless phones has made them an indispensable tool to businesses and individuals alike. Many individuals carry their wireless phone almost everywhere they go just in case they need to make a call. As a result, friends and colleagues have come to reasonably expect they can get a hold of each other almost immediately with a single phone call.

While talking on a wireless phone is generally preferred, it is sometimes not possible as one party may be busy or in a meeting. Instead of a voice conversation, people may instead use their wireless phone to type a short text message and send it to another user. The short text message is sent over a specially provisioned data channel within the voice network called Short Messaging Service (SMS). SMS addresses messages using the same phone number provisioned to the wireless phone for voice communication but sends them over the data channel on the voice network. This data channel for SMS is generally limited to 140 text characters since it relies upon unused bandwidth made available when a control channel within the voice network is idle and not occupied setting up or managing voice calls.

Operators of the voice networks discovered they could charge users an additional fee for using SMS even though it cost very little for them to implement. The voice networks effectively charge for each message sent thus making the SMS communication a source of revenue. Even higher fees apply to users who send international messages to people outside their country.

Unfortunately, SMS communication remains a relatively closed and proprietary system as it is controlled by the operators of the voice network. Little has been done to increase the features associated with SMS messaging or decrease the costs as there are no competing systems. People sending text messages generally accept the 140 character limitation for sending each transmission and the relatively costly fee structure. Despite these limitations, the popularity of SMS communication on wireless devices continues to attract new users and grow in popularity. There is a need to develop an easy to use messaging system with lower costs and more features.

SUMMARY

Aspects of the present invention provide a method and system of verifying the association between a phone number and a phone device. One aspect of the present invention independently verifies that a phone number has been provisioned on a voice network to a phone device and then uses the phone number on a new synthetic communication network for transmitting data. Aspects of the present invention initially receive a request to add a phone device previously registered with a voice network to the synthetic communication network for data. The phone number initially provided with the phone device on the voice network is classified as an unconfirmed phone number. For example, the unconfirmed phone number may not yet be associated with any phone device and therefore cannot be used on the synthetic communication network. The unconfirmed phone number may also be used as a ploy for diverting messages from an intended recipient to an unintended recipient. To confirm the phone number, one aspect of the present invention attempts transmission of a verification message from the phone device through a data channel on the voice network and back to the phone device. It is presumed that the phone device has access to the data channel on the voice network. Aspects of the present invention determine whether the verification message was received by the phone device over the data channel of the voice network. If the verification message was received then aspects of the present invention indicate that the unconfirmed phone number should be identified as a confirmed phone number associated with the phone device. Once confirmed, the method and system authorizes data communication using the phone devices on the synthesized communication network with the confirmed phone number.

Yet another aspect of the present invention concerns a subsequent verification of the association between a phone number and the phone device. This can be useful for continued use of a phone number and phone device on the synthesized network in accordance with aspects of the present invention. From time to time, the phone number of a phone device may need to be reconfirmed in a case the phone number has been abandoned and reassigned to a different phone device. In this implementation, the method and system receives an unconfirmed phone number asserted to be associated with a particular phone device. To confirm the phone number, aspects of the present invention generate a verification message on the phone device to verify the unconfirmed phone number. This verification message is transmitted from the from the phone device through the data channel on the voice network using the unconfirmed phone number. If the unconfirmed phone number returns back to the phone device then the previously unconfirmed phone number may become confirmed. Accordingly, aspects of the present invention determine whether the verification message received by the phone device over the data channel of the voice network was in fact the verification message for the unconfirmed phone number. If the verification message was received then the method confirms the verification message and indicates the unconfirmed phone number should be identified as a confirmed phone number. If the verification is not received then aspects of the present invention may indeed not confirm the phone number association with the phone device. Aspects of the present invention may further remove or disallow the phone number and phone device from further communications on the synthetic communication network.

BRIEF DESCRIPTION OF THE DRAWINGS

Like reference numbers and designations in the various drawings indicate like elements.

Figure 1:
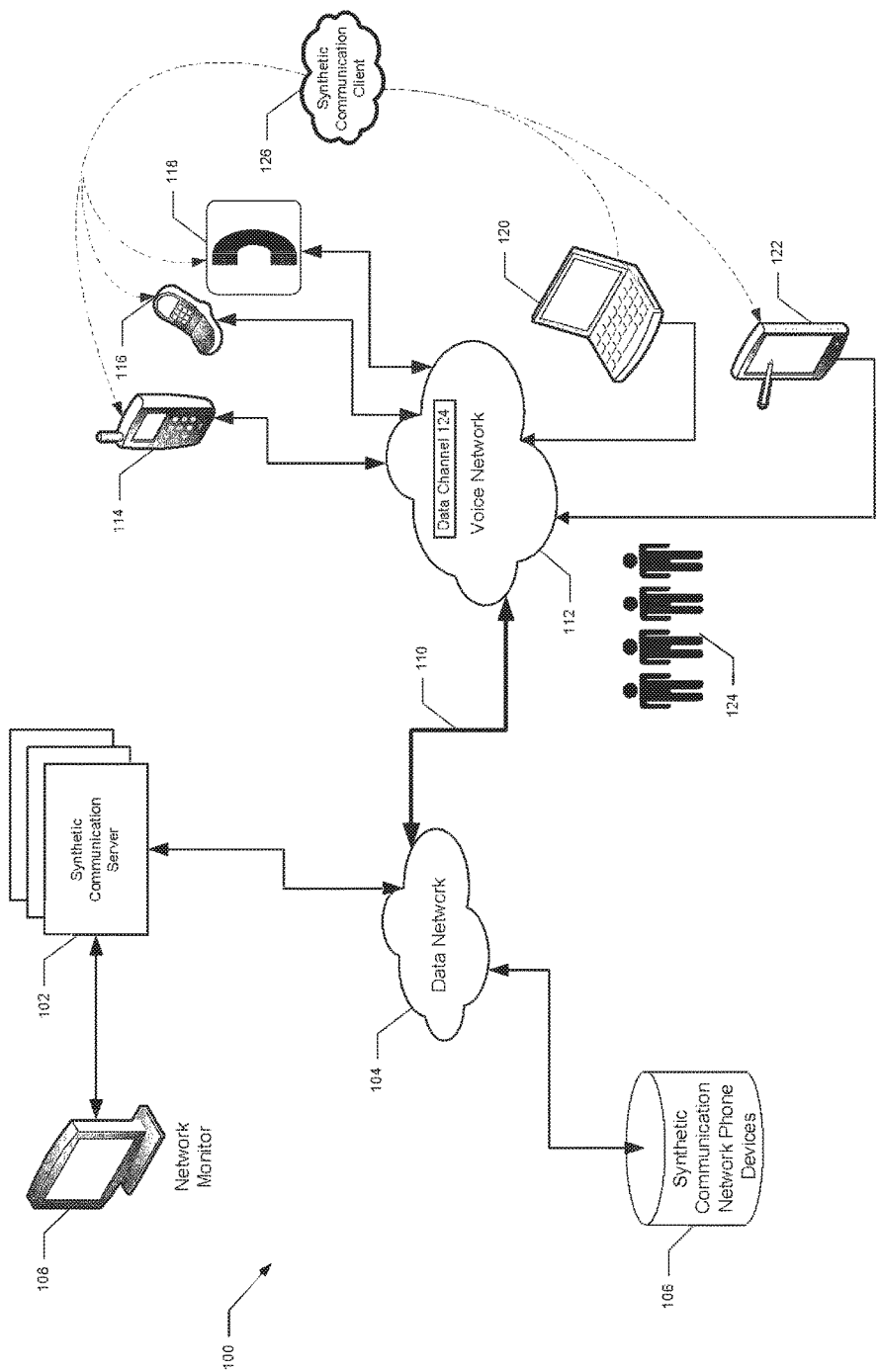
FIG. 1 is a block diagram illustrating a synthetic communication network created using a phone number and data network in accordance with one implementation of the present invention.

Aspects of the present invention provide one or more of the following advantages. Users can registered their phone devices and join a synthetic communication network using a phone number previously only available for use on a voice network. The same phone number provisioned by a phone company or wireless phone provider can be reused on the synthetic communication network and take advantage of new data communication services. Some of the data communication services made available through the synthetic communication network includes features not available on the conventional voice network. For example, users of the synthetic communication network may use their phone number to enjoy a feature-rich form of text messaging on their phone devices not available on the voice network.

The synthetic communication network also offers more competitive pricing on data communication services than a voice network. Aspects of the present invention combine the convenience of using a phone number with a development platform for use with the Internet and other data networks. By opening the development platform to data networks, users are not limited to pricing schemes dictated by a phone company or wireless phone provider managing the voice network. Instead, the users may use their phone number and directly subscribe to new data communication services through the Internet. While the phone company or wireless provider may control the initial provisioning of a phone number, aspects of the present invention allows the phone number to access a wider range of data communication services with competitive pricing and feature richness.

Phone number verification implemented in accordance with aspects of the present invention enables phone numbers provisioned from the voice network to be reused on a data network. The synthetic communication client works with the synthetic communication server to make sure the phone number is associated with the particular phone device. Aspects of the present invention may re-verify the association between the phone number and the phone device just in case the phone number has been abandoned and reassigned by the voice network to a different phone device. Once a phone number is verified, the phone device may register and begin using their phone device on the synthesized communication network without requesting additional services from their wireless phone carrier.

The synthetic communication network of the present invention further allows the use of phone numbers provisioned from voice networks around the world. A normalization process performed on the phone numbers in accordance with the present invention prevents conflicts from occurring between two different phone numbers. Even if phone numbers from two different countries initially appear the same, normalization ensures that phone numbers can be distinguished. Normalization performed in accordance with aspects of the present invention allows phone numbers provisioned from around the world to be used on the synthetic communication network.

Aspects of the present invention can also keep status on phone devices even though they might be members of different voice networks. The normalized phone number for each phone device is used to identify and track the status of each phone device. If a user changes the status on a phone device then all other phone devices on the synthetic communication network may potentially receive the status update.

FIG. 1 is a block diagram illustrating a synthetic communication network 100 in accordance with aspects of the present invention. In one implementation, a synthetic communication server 102 and network monitor 108 are operatively coupled together to a database of synthetic communication network phone devices over a data network 104. For example, the database of synthetic communication network phone devices 106 includes records of the phone devices registered on the synthetic communication network 100. Data network 104 may include one or more data networks having access to the Internet and further access to a voice network 112 over a communication bridge 110.

A wireless phone provider may provide voice network 112 and communication bridge 110 in order to connect phone devices on voice network 112 to data network 104 and the Internet or an Intranet. Alternately, voice network 112 may be provided by a hybrid phone provider offering both wired and wireless devices that also have access to the Internet or an intranet over communication bridge 110 and data network 104. In general, voice network 112 provides voice communication between phone devices registered on the voice network 112 and data services like SMS text messaging through data channel 124. In this example, voice devices on voice network 112 may include wireless smart phones 114, conventional wireless phones 116, wired telephones 118, netbooks 120 and smartbooks 122. Indeed, it is contemplated that the voice network may include a mobile music player device if it has Wifi connectivity. Each phone device is provisioned a phone number and some have the ability to display text and/or images in addition to transmitting voice. These phone devices also have the ability to access a data network using a data protocol such as TCP/IP. Both netbook 118 and smartbook 122 have general purpose computing capabilities but also have been provisioned with phone numbers from the voice network 112 and therefore can also transmit voice in addition to accessing data network 104.

The wireless phone provider of voice network 112 may implement any one or more different wireless protocols. Typically, most wireless providers use Global System for Mobile (GSM), Code Division Multiple Access (CDMA) or some variant compatible with one or more features of these technologies. Each of these and other wireless protocols support a data channel 124 that transmits text and data between phone devices using the SMS protocol. Due to limitations of voice network 112, SMS messages are limited to approximately 128 to 160 characters and managed entirely by the wireless phone provider of the voice network 112.

Little has evolved in the area of SMS messaging as access to these systems are proprietary and controlled by the wireless phone providers. In part, these efforts are an attempt by the wireless phone providers to protect the revenue stream generated by the per message fees and additional charges. Alternate protocols such as Multimedia messaging service (MMS) allows multimedia transmission in addition to text however suffer similar limitations within the voice network 112.

To address these and other limitations, aspects of the present invention allow much more robust communication while reusing the phone numbers provisioned from the voice network. Synthetic communication server 102 creates a connection between phone devices over the Internet and bypasses data channel 124. Phone devices registered on the synthetic communication network 100 may subscribe to improved text messaging and other data services across data network 104 in accordance with aspects of the present invention using their phone number provisioned on the voice network 112. In turn, users 124 of these registered phone devices have improved text messaging and other data services at lower or no per message costs. Instead of per message charges, phone devices would only have to subscribe to Internet access in order to reach data network 104 over bridge 110. The Internet access on these phones devices may use one or more different data plans incorporating technologies such as Enhanced Data Rates from GSM Evolution (EDGE), Universal Mobile Telephone Standard (UMTS), High Speed Downlink Packet Access (HSDPA) and Evolution Data Optimized (EVDO). Phone devices may also access data network 104 and the Internet using other wireless technologies such as WiMax, WiFi 802.11a/b/c/n/x or other similar protocols.

Figure 2:
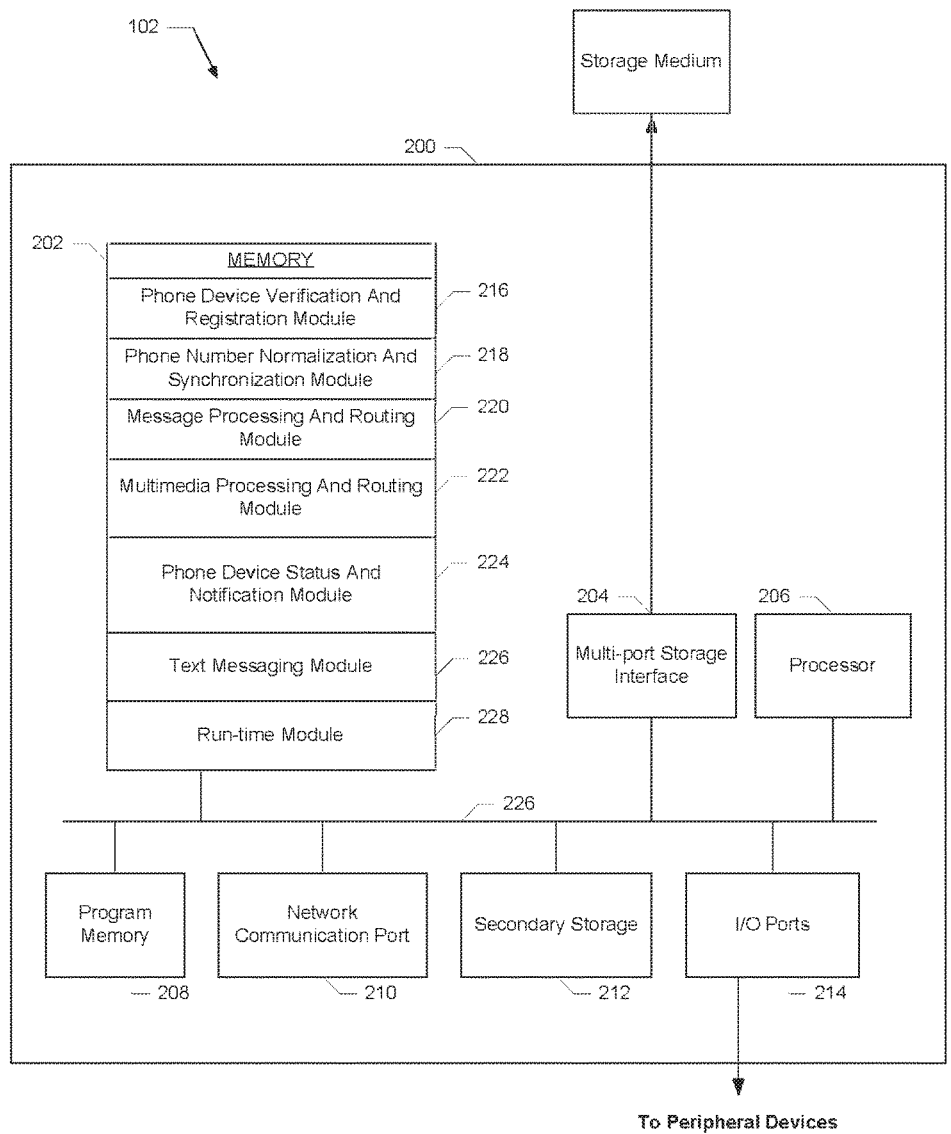
FIG. 2 is a block diagram of a system used in one implementation for performing the apparatus or methods of the present invention in accordance with one implementation of the present invention.

FIG. 2 is a block diagram of a system 200 used in one implementation for performing the apparatus or methods of the present invention. System 200 includes a memory 202 to hold executing programs (typically random access memory (RAM) or writable read-only memory (ROM) such as a flash ROM), a multiport storage interface 204, a processor 206 for executing instructions, a program memory 208 for holding drivers or other frequently used programs, a network communication port 210 for data communication, a secondary storage 212 with secondary storage controller for backup/high-availability, and input/output (I/O) ports 214 with I/O controller operatively coupled together over an interconnect 226. In addition to implementing the present invention using a conventional personal computer or server, system 200 can be preprogrammed, for example, using field-programmable gate array (FPGA) technology, ROM or it can be programmed (and reprogrammed) by loading a program from another source (for example, from a floppy disk, a CD-ROM or other computer-program product with executable instructions or another computer). Also, system 200 can be implemented using customized application specific integrated circuits (ASICs).

In one implementation, processor 206 executes instructions in memory 202 selected from one or more components including phone device verification and registration module 216, phone number normalization and synchronization module 218, message processing and routing module 220, multimedia processing and routing module 222, phone device status and notification module 224, and run-time module 228 that manages system resources used when processing one or more of the above components on system 200.

Phone device verification and registration module 216 verifies that a phone number has been provisioned to a phone device then registers the phone device on the synthetic communication network in accordance with implementations of the present invention. One verification module of the present invention retrieves the phone number directly from firmware on the phone device and performs the verification operations. Alternatively, the user of the phone device may supply the phone number for the phone device through a keyboard or other data entry device associated with the phone device. Aspects of the present invention first verify that the phone number is registered with the particular phone device before it can be registered on the synthetic communication network of the present invention. Over time, it may be necessary to verify a phone number more than once to ensure it is still associated with a particular phone device. In some cases, a phone number initially associated with one phone device may later be associated with a different phone device if the owner of the phone device cancels the voice service or changes providers. The phone number and corresponding phone device can be registered on the synthetic communication network in accordance with aspects of the present invention and begin transmitting data once it has been successfully verified.

Phone number normalization and synchronization module 218 normalizes the format of different phone numbers in a phone directory on the phone device to a predetermined standard. Implementations of the present invention process each phone number and consider how they should be modified and/or formatted. The normalized phone numbers preferably conform to an international telephone number (ITN) standard and incorporate a country code and other information to identify the ITN on a uniform basis.

The normalized phone numbers are used to synchronize the phone directory of phone numbers with registered phone numbers on the synthetic communication network of the present invention. If a phone number in the directory is also registered on the synthetic communication network then it is added or synchronized with entries in the synthetic communication client running on the phone device. This synchronization continues as new phone numbers are added to the phone directory and normalized phone numbers are added to the synthetic communication network.

Message processing and routing module 220 ensures messages from one phone device pass to another phone device in accordance with aspects of the present invention. The messages on the synthetic communication network use the normalized phone numbers to identify phone devices with particularity. Once identified, the routing module creates a network connection between the phone devices using a protocol such as TCP/IP. This message processing and routing module 220 generally passes text messages between phone devices registered on the synthetic communication network according to their previously verified and normalized phone numbers. In some implementations, messages processed by routing module 220 may operate in a compatibility mode and thus transmit one or more groups of 140 text characters. Alternatively, message processing and routing module 220 may indeed transmit a variable length of characters unlimited by the 140 characters of legacy SMS communication but instead dependent upon the length of the message being transmitted and capacities of the phone device sending or receiving the message.

Multimedia processing and routing module 222 operates in similar manner except that it processes a wider range of data types and may send images, video, sound or other data to a normalized phone number. Additional compression and encoding methods may be implemented on the multimedia processing and routing module 222 to effectively increase transmission bandwidth and decrease storage requirements.

Phone device status and notification module 224 enables phone devices to update their current status while tracking the status of other phone devices within the synthetic communication network. The synthetic communication client running on each phone device generally sends status updates to the synthetic communication servers. Likewise, the synthetic communication server sends updated status out to each of the phone devices tracking the status of the other phone devices. Aspects of the present invention also allows the synthetic communication client to determine the status of other members in their phonebook or directory without initiating a phone call, text message or even a separate communication session. For example, phone device status information may be obtained by accessing the synthetic communication servers holding the status in a status area on the servers.

Text messaging module 226 provides conventional text messaging functions used for phone number verification in accordance with aspects of the present invention. Conventional text messaging sends text messages to phone devices over a data channel portion of a voice network. Aspects of the present invention send a verification text message using text messaging module 226 to confirm that a phone number is associated with the particular phone device. In one implementation, text messaging module 226 subscribes to national and international SMS services to verify phone numbers nationally and internationally.

Figure 3:
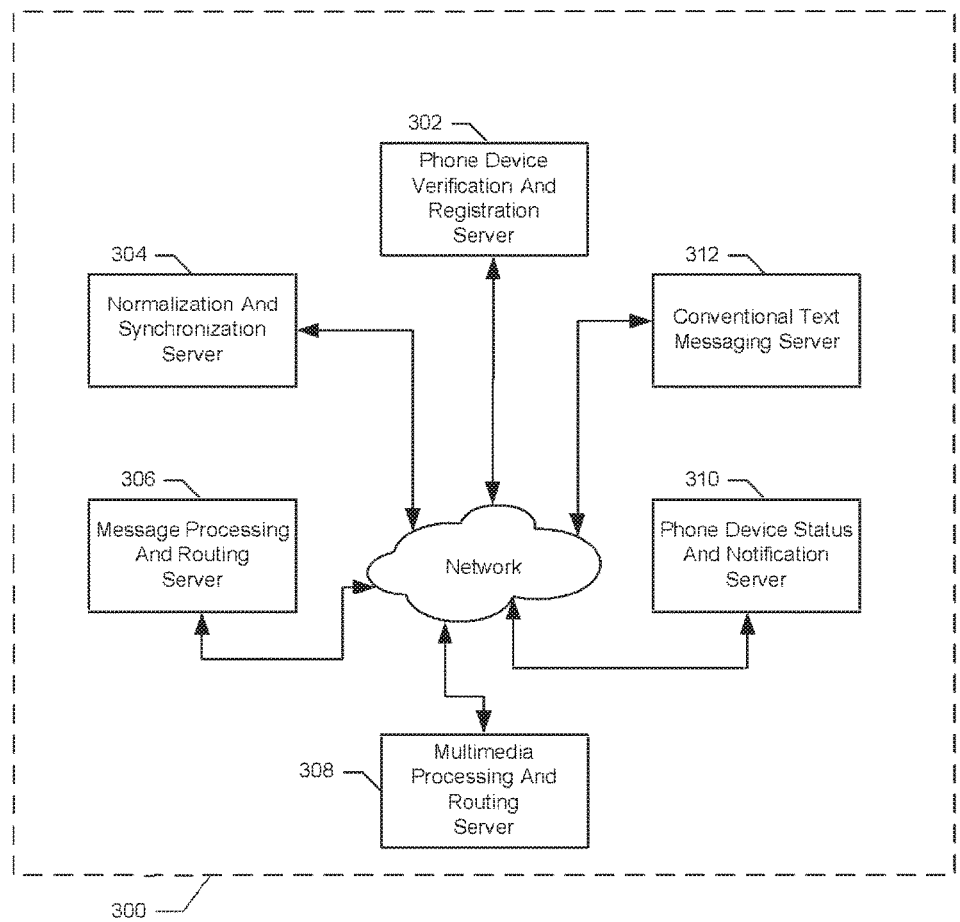
FIG. 3 is a block diagram for an alternate system used in one implementation for synthesizing a communication network in accordance with aspects of the present invention.

FIG. 3 is a block diagram of an alternate system 300 implementing a synthetic communication server 102 in accordance with aspects of the present invention. Instead of single computer system, alternate system 300 uses a cluster of computers to performing different discrete functions of the synthetic communication server 102. It is contemplated that the cluster of computers in alternate system 300 may be separate and distinct physical computers or virtual computers implemented using one or more virtual machines with virtualization technology made available through companies such as VMWARE® Palo Alto, Calif.

In general, the cluster of computers advantageously improves scalability through better overall utilization of resources and increases reliability as it is less likely for multiple computers to fail simultaneously. One implementation of this alternate system 300 may separate the different functions used in implementing aspects of the present invention onto different computers within the cluster of computers. For example, it is contemplated that six virtual machines may each be configured to execute phone device verification and registration server 302, normalization and synchronization server 304, message processing and routing server 306, multimedia processing and routing server 308, phone device status and notification server 310 and conventional text messaging server 312 on a cluster of three physical computers with virtualization technology. These different servers in alternate system 300 function in a similar manner as the aforementioned corresponding modules described in conjunction with and illustrated in FIG. 2. Indeed, it is further contemplated that these different servers may include added administrative functions so they can be separately administered and increased interprocess communication so that the individual servers may share information and take advantage of the inherent redundancies and failover possibilities available on the cluster configuration of the present invention.

Figure 4:
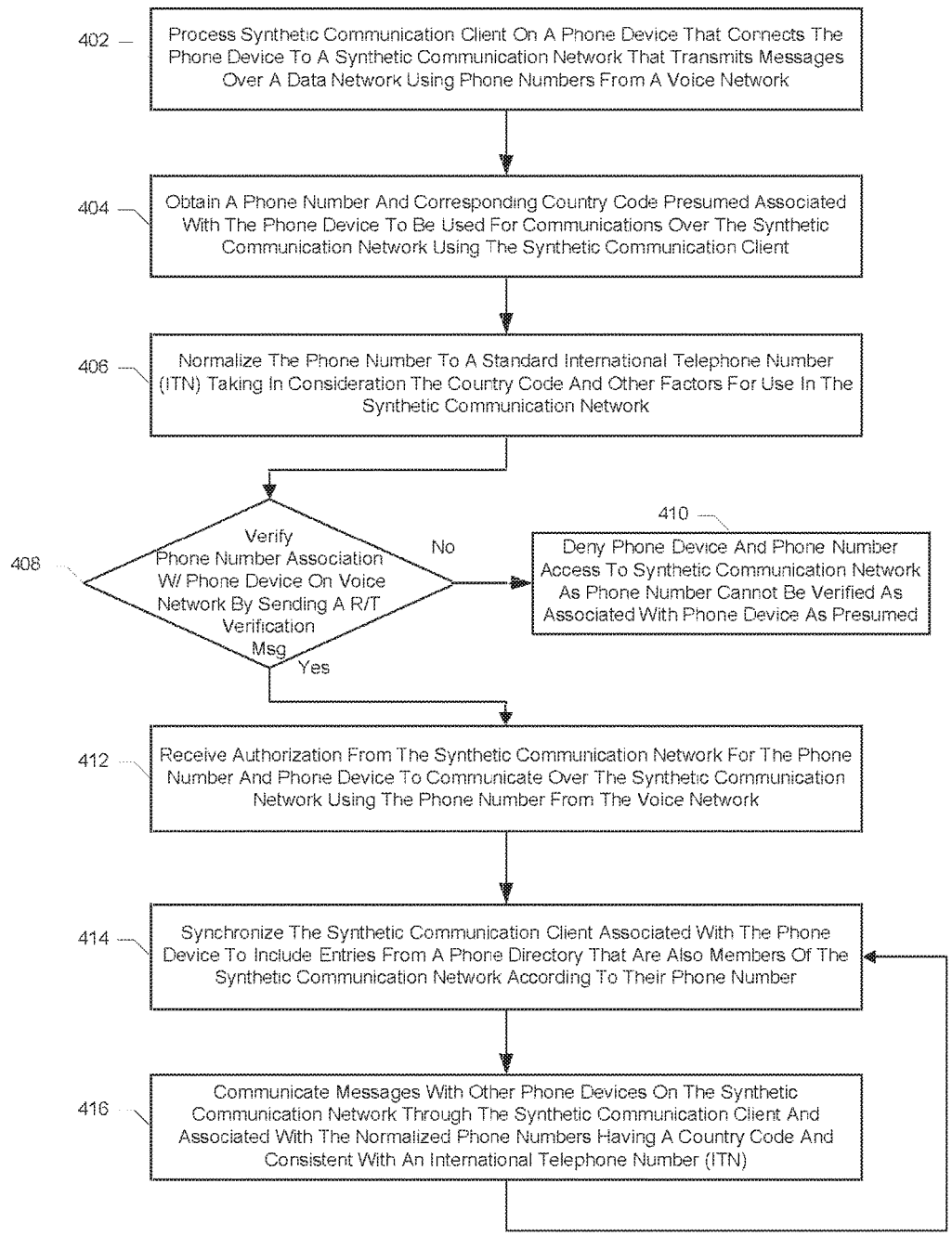
FIG. 4 is a flowchart representation of the operations for registering a phone device on the synthetic communication network in accordance with aspects of the present invention.

FIG. 4 is a flowchart representation of the operations used by a phone device to register on the synthetic communication network using a phone number in accordance with one implementation. The synthetic communication client executes on the phone device in accordance with aspects of the present invention using a phone number from a voice network to connect the phone device to the synthetic communication network (402). Synthetic communication client performs various operations including registering the phone number and eventually facilitating the communication of text, images, video and other media over the synthetic network using the phone number. This synthetic communication client may be downloaded directly over-the-air using wireless communication protocols or through a website accessed by the phone device over the Internet. For example, the synthetic communication client may be downloaded wirelessly through the Apple® Application Store, a website on the Internet or other distribution points and then onto the phone device. Alternatively, a synthetic communication client may also be downloaded and installed directly on the phone device through a memory card, hard drive or other storage device attached to the phone device.

In one implementation, the synthetic communication client obtains the phone number and corresponding country code presumed to be associated with the phone device and used for communications over the synthetic communication network (404). The synthetic communication client running on the phone device may present a series of default options suggesting an international dialing prefix, a country code and a request that the user enter the phone number of the phone device. Typically, these options are suggested by the synthetic communication client based upon the country that the phone device is currently registered in. However, it is also possible that a user can override these suggested settings and enter their own country code, phone number and other information in the default options.

It is also possible for the client obtain the phone number from the phone device programmatically through an application programming interface (API). For example, the synthetic communication client may interface with an API that accesses an area of firmware on the phone device holding the phone number provisioned to the phone device when it was registered on the voice network. In this implementation, the phone number obtained through the API is automatically entered into the "phone number field" section of the synthetic communication client application. The user may decide to accept or modify the phone number in the "phone number field" suggested by the client. As such, it is also possible for the user to erase the suggested phone number entirely and specify a different phone number in the "phone number field" of the client as previously described.

Next, the synthetic communication client normalizes the phone number to a standard international telephone number (ITN) format taking into consideration the country code and other factors for use in the synthetic communication network (406). Normalizing the phone number to the ITN allows the synthetic communication network to uniquely identify the phone number and phone device on an international basis. Without normalization, it might be possible for two phone devices from different countries or areas to have identical phone numbers on the synthetic communication network. The normalized phone number ensures a country code and other fields are in the phone number thus greatly limiting or eliminating the possibility of duplicate phone numbers existing on the synthetic communication network. To avoid the potential conflict, the normalization process performed in accordance with the present invention makes sure each phone number adheres to the following ITN format:

International Telephone Number (ITN) Format

+<CC> <Phone number>
Where
"+": International dialing prefix—This is the standard prefix to indicate that a country code and phone number associated with the country code follows.
"<CC>": Country code—The one, two or three digit country code specifies the country associated with the phone number that follows. For example, United States is country code "1" and United Kingdom is country code "44".
<Phone Number>: Phone number—this is the phone number that the user of the phone device may typically provide as their phone number to others in their own country.

Several operations may be performed in normalizing the phone number associated with the phone device. The synthetic communications client first attempts to incorporate the International dialing prefix "+" and "<CC>" and Country code to the phone number provided. Aspects of the present invention presumes that the phone number provided does not include the International dialing prefix of "+" (or its variants) or the country code and therefore adds them to the phone number. The country code defaults to the country code associated with the country where the phone has been registered or, alternatively, whatever country the user of the phone device specifies is the country of origin. The "+" symbol is added because it indicates that the country code and phone number will subsequently follow in sequence thereafter.

Second, the synthetic communications client may check for a few different conditions of the phone number. A lead-in character or characters may be added or removed from the start of the phone number. Some users may inadvertently add lead-in characters to their phone number out of habit to indicate access to local exchanges or other conditions. However, if a lead-in character is not meant to be part of the ITN then the client proceeds to remove the lead-in character from the phone number. For example, a lead-in character of "0" in a phone number in the United Kingdom indicates a local dialing prefix however it is not used in the ITN representation of a United Kingdom phone number. Accordingly, the synthetic communications client will remove the lead-in character "0" from a phone number when the country code associated with the United Kingdom (i.e., "44") is indicated.

Alternatively, the voice network in certain countries may need to add a lead-in character to the phone number for a valid ITN. For example, in Mexico a leading "1" is generally inserted after the country code for Mexico (i.e., "52") and before the phone number begins. The synthetic communication client of the present invention may therefore consider prepending a lead-in character of "1" to the phone number when the country code is "52" since few users would know to include this value in their phone number.

Third, aspects of the present invention may also check the length of the phone number to make sure it is the appropriate length for the country specified by the country code. If the length of the phone number is improper, the client may reject the phone number provided and indicate that it is either too long or too short in view of known acceptable phone numbers for the particular country. For example, a phone number having 15 digits may be rejected as longer than the accepted 10 digit numbers used in the United States. Once these and other checks are completed, the phone number for the phone device is considered normalized and the ITN representation of the phone number is ready for verification.

The verification operation ensures that the phone number originally provided to the synthetic communication client is indeed associated with the phone device. Conversely, if the phone number was invalid or associated with another phone device then the verification operation will indicate that the phone number (as well as the ITN representation of the normalized phone number) cannot be verified. Verification in one implementation of the present invention confirms the association between the phone number and the phone device by sending a round-trip verification message over a data channel of the voice network (408). In at least one implementation, the synthetic communication client creates a verification message embedded with text that uniquely identifies the verification message. For example, the embedded text may include a 3-digit randomly generated number to identify the message on its return trip back to the synthetic communication client. Both a "From:" or equivalent field and a "To:" or equivalent field in the verification message use the provided phone number presumed to be associated with the phone device.

In one implementation, the verification message may be sent from the synthetic communication client on the phone device using short messaging service (SMS) on the voice network. A successful return trip of the verification message back to the same synthetic communication client verifies the phone number in accordance with the present invention. Further details on the verification operation are described later herein in further detail. If the verification message does not return then there is an unsuccessful verification of the phone number and phone device association. (408-No) Accordingly, the synthetic communication client may deny the phone device and phone number access to synthetic communication network (410).

If the phone number association with the phone device is verified (408-yes) then the synthetic communication client receives authorization for the phone device to communicate over the synthetic communication network using the phone number from the voice network. In one implementation, a user of the newly added phone number and phone device can then communicate with other users who also have phone devices and phone numbers admitted to the synthetic communication network of the present invention. Thereafter, data is transmitted between phone devices on the synthetic communication network using each the respective phone number represented as a unique ITN.

The synthetic communication client offers to check if some or all of the phone numbers in a directory on the phone are also registered on the synthetic communication network. Users typically allow the synthetic communication client to check their phone directory as they want to communicate over the synthetic communication network with their current friends and associates. Accordingly, the synthetic communication client associated with the phone device is synchronized with entries in the phone directory from the phone device that are also members of the synthetic communication network (414). Each entry in the phone directory of the phone device is also checked for membership in the synthetic communication network. Aspects of the present invention also continue to update the synthetic communication client to include additional members of the synthetic communication network as new members join and as new phone numbers are added to the phone directory of the phone device.

Once synchronization is complete, aspects of the present invention can communicate messages with other members of the synthetic communication network through the synthetic communication client (416). Typical communication between members of the synthetic communication network is done over a data network such as the Internet using their respective normalized phone numbers having a country code and consistent with an international telephone number (ITN). The simplicity of reusing the phone numbers in their phone directory to communicate with other phone devices makes the synthetic communication network of the present invention compelling. Moreover, users of the synthetic communication network may use the phone number to send text messages over the Internet and not pay expensive per message charges for local and international text messaging over the data channel of their voice network.

Figure 5:
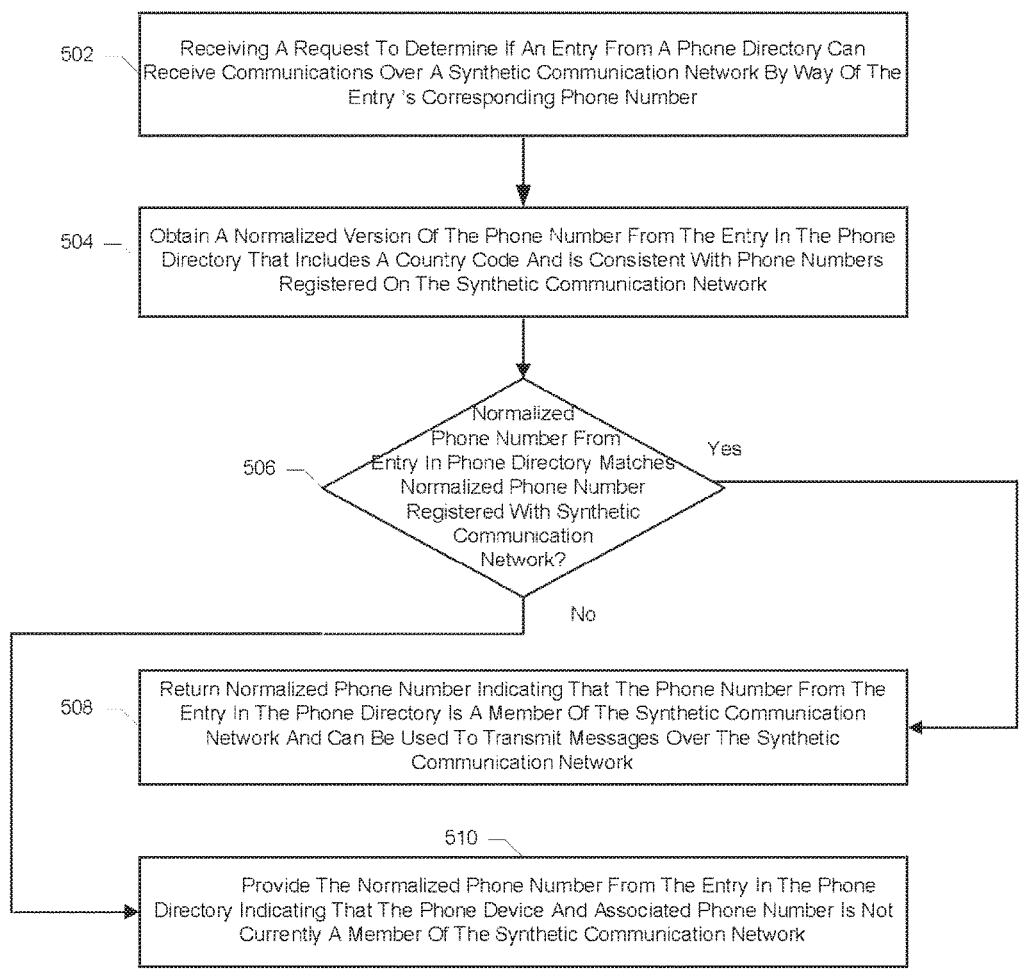
FIG. 5 is a flowchart representation of the operations for independently confirming the association of a phone number and a phone device on the synthetic communication network in accordance with aspects of the present invention.

FIG. 5 is a flowchart diagram of the operations used to determine whether a directory entry from a phone device may participate in communications over the synthetic communication network in accordance with aspects of the present invention. Essentially, these operations determine whether an entry or entries in the phonebook of a phone device are also registered members of the synthetic communication network.

Aspects of the present invention determine if one or more directory entries from a phone device can receive communications over the synthetic communication network using the directory entry's phone number (502). To make such a determination, each phone number in the phone directory of the phone device is compared with registered phone numbers on the synthetic communication network. Making the comparison further involves normalizing phone numbers from the directory in the same manner as registered phone numbers on the synthetic communication network. (504) For example, the normalized version of a phone number from the directory should include a country code and be formatted consistent with an international telephone number (ITN) format. Details on normalizing one or more phone numbers in accordance with aspects of the present invention are described in further detail later herein.

Next, a comparison determines whether the normalized phone number from a directory entry match a normalized phone number registered with the synthetic communication network (506). A match between a normalized phone number from the directory and a normalized phone number registered on the synthetic communication network indicates that the phone number from the directory is also a member of the synthetic communication network. The match does not consider details such as a person's name, address, company or other personal information. Since these details are not part of the comparison and determination, they need not be stored on or sent to the synthetic communication server. Thus, if there is a match between the two normalized phone numbers (506-Yes) then aspects of the present invention returns the normalized phone number and indicates that the phone number from the directory is a member of the synthetic communication network. The phone device corresponding to the phone number can be used to exchange messages over the synthetic communication network using the normalized phone number (508). Storing the normalized phone number synchronizes the synthetic communication client with the phone number entries in the directory on the phone device. This synchronized list of normalized phone numbers is used by the synthetic communication client to communicate with other phone devices over the new synthetic communication network.

When the normalized phone number from the directory does not match (506-No), aspects of the present invention may still provide the normalized phone number to the synthetic communication client but indicate that the normalized phone number is not yet registered on the synthetic communication network (510). Likewise, the client may synchronize the normalized phone numbers but will indicate on the graphical user interface (GUI) that the phone number cannot be used to send messages over the synthetic communication network. For example, the GUI of the synthetic communication client may display the name of the person, the corresponding normalized phone number and an icon that the particular number is not yet registered on the synthetic communication network of the present invention. If the normalized phone number subsequently does register, then a different icon on the GUI of the synthetic communication client will indicate that the number is registered and can communicate on the synthetic communication network. Information on the person's name, address, company or other details is generally obtained by cross referencing a normalized phone number with phone numbers from the directory on the phone device. For privacy reasons, the synthetic communication server may leave all personal information within the directory of the phone device and only store normalized phone numbers registered on the synthetic communication network.

Figure 6:
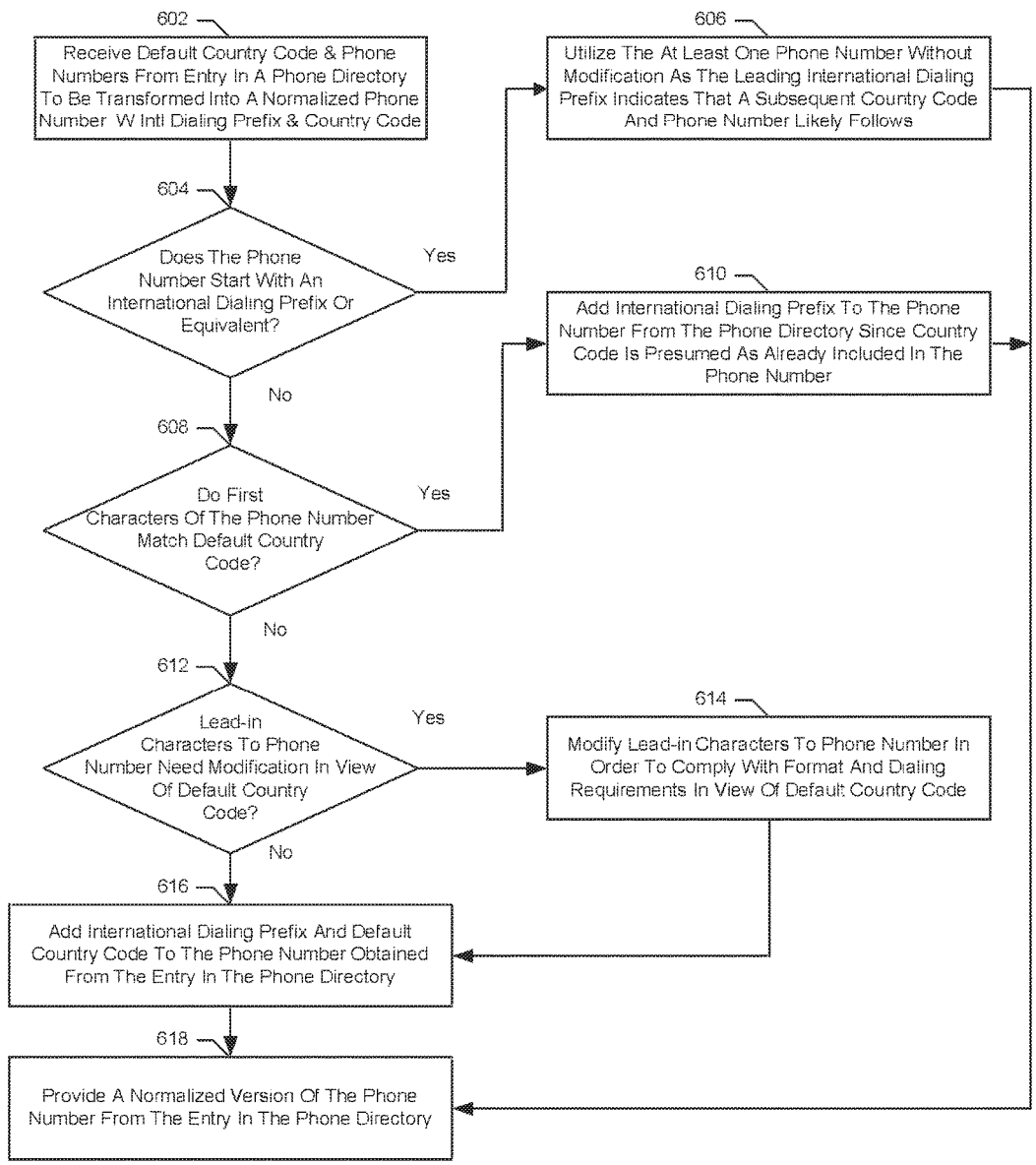
FIG. 6 is a flowchart detailing the operations associated with normalizing at least one phone number from a phone directory on a phone device in accordance with aspects of the present invention.

FIG. 6 is a flowchart detailing the operations associated with normalizing a phone number from a phone directory on a phone device in accordance with aspects of the present invention. Phone numbers normalized in accordance with the present invention can be used to identify and communicate with specific phone devices over a synthetic communication network of the present invention. The synthetic communication network carries messages to phone devices throughout the world even though the underlying phone numbers may have been provisioned from disparate voice networks and different phone carriers located in different countries.

In one implementation, a synthetic communication server receives one or more phone numbers from the phone directory on the phone device and performs the normalization on behalf of the synthetic communication client. Initially, the synthetic communication server receives a default country code and at least one phone number from the phone directory to be transformed into a normalized phone number with international dialing prefix and country code (602). A suggested default country code generally corresponds to the country associated with the voice network where the phone number and phone device were provisioned. In some cases the default country code of the phone device may be modified by the user of the synthetic communication client to accommodate a different country and country code.

Implementations of the present invention first check whether the phone number starts with an international dialing prefix or equivalent (604). For example, a phone number from the phone directory of a phone device registered in the United Kingdom may be entered as +44 2710 5566. If the "+" symbol is included in a phone number (604-Yes) then aspects of the present invention presumes that the international dialing prefix is followed by a subsequent country code and phone number and in a proper international telephone number (ITN) format as previously described.

Depending on the country code, aspects of the present invention may also replace an alternate international dialing prefix such as a "011" in the United States with the universal international dialing prefex "+". Accordingly, the synthetic communication server may use the phone number without modification if the international dialing prefix is the leading character to the phone number as provided (606).

Next, aspects of the present invention determine if the first few characters of the provided phone number also happen to match the default country code provided (608). If the default country code appears in the first characters (608-Yes) then it is presumed that the phone number includes a country code but is missing an international dialing prefix. Consistent with aspects of the present invention, the synthetic communication server adds an international dialing prefix to the phone number from the phone directory (610).

Alternatively, if the first characters do not match the default country code then aspects of the present invention may determine whether lead-in characters to the phone number need to be added, removed or modified in view of the default country code (612). When the lead-in characters of the phone number need modification (612-Yes) then the synthetic communication server modifies lead-in characters to phone number in order to comply with format and dialing requirements of ITN in view of default country code (614). As previously described, some users may add lead-in characters to phone numbers in their phone directory out of habit or to indicate access to local exchanges or other conditions. If the lead-in character is not meant to be part of the ITN then the normalization process on the server proceeds to remove the lead-in character from the phone number. For example, a lead-in character "0" on the phone number in the United Kingdom may indicate a local dialing prefix however it is not used in the ITN representation of a United Kingdom phone number. Accordingly, the server will remove the lead-in character "0" from a phone number when the default country code provided is the United Kingdom (i.e., "44").

Conversely, voice network in other countries may need a lead-in character added to a phone number to create a valid ITN. For example, in Mexico a lead-in character "1" may be inserted after the country code for Mexico (i.e., "52") and before the start of the phone number. The synthetic communication client of the present invention therefore may prepend a lead-in character of "1" to the phone number when the default country code is 52 as few users might know to include this value in their phones number when dialing internationally.

Additionally, aspects of the present invention may then add both the international dialing prefix and default country code to the phone number obtained from the phone directory. For example, the synthetic communication server of the present invention prepends a phone number with a "+44" when the default country is United Kingdom and no international dialing prefix or country codes are detected in the first portion of characters from the phone number (616).

Once normalized, aspects of the present invention provide a normalized version of the at least one phone number from the phone directory and indicates if a phone number is also a member of the synthetic communication network (618). For efficiency, one implementation of the synthetic communication server may receive and process a group of the phone numbers in a single request. Similarly, the resulting set of one or more normalized phone numbers may be sent back to the synthetic communication client in one transmission. It is advantageous for the synthetic communications server to keep copies of all the normalized phone numbers from each phone device and phone directory. For example, the synthetic communications server may be able to determine if a phone device and phone number are already members of the synthetic communication network by simply comparing the normalized phone number with other previously registered phone numbers and ITN values.

It should be appreciated that membership in the synthetic communication network may be determined using only the phone numbers normalized in accordance with implementations of the invention. Normalized phone numbers stored by the synthetic communication server include country code information and identify the corresponding phone device on an international basis. Registering as a member of the synthetic communication network therefore only requires providing an ITN and not providing any personal information that other communication networks might require, such as a login or username.

Figure 7:
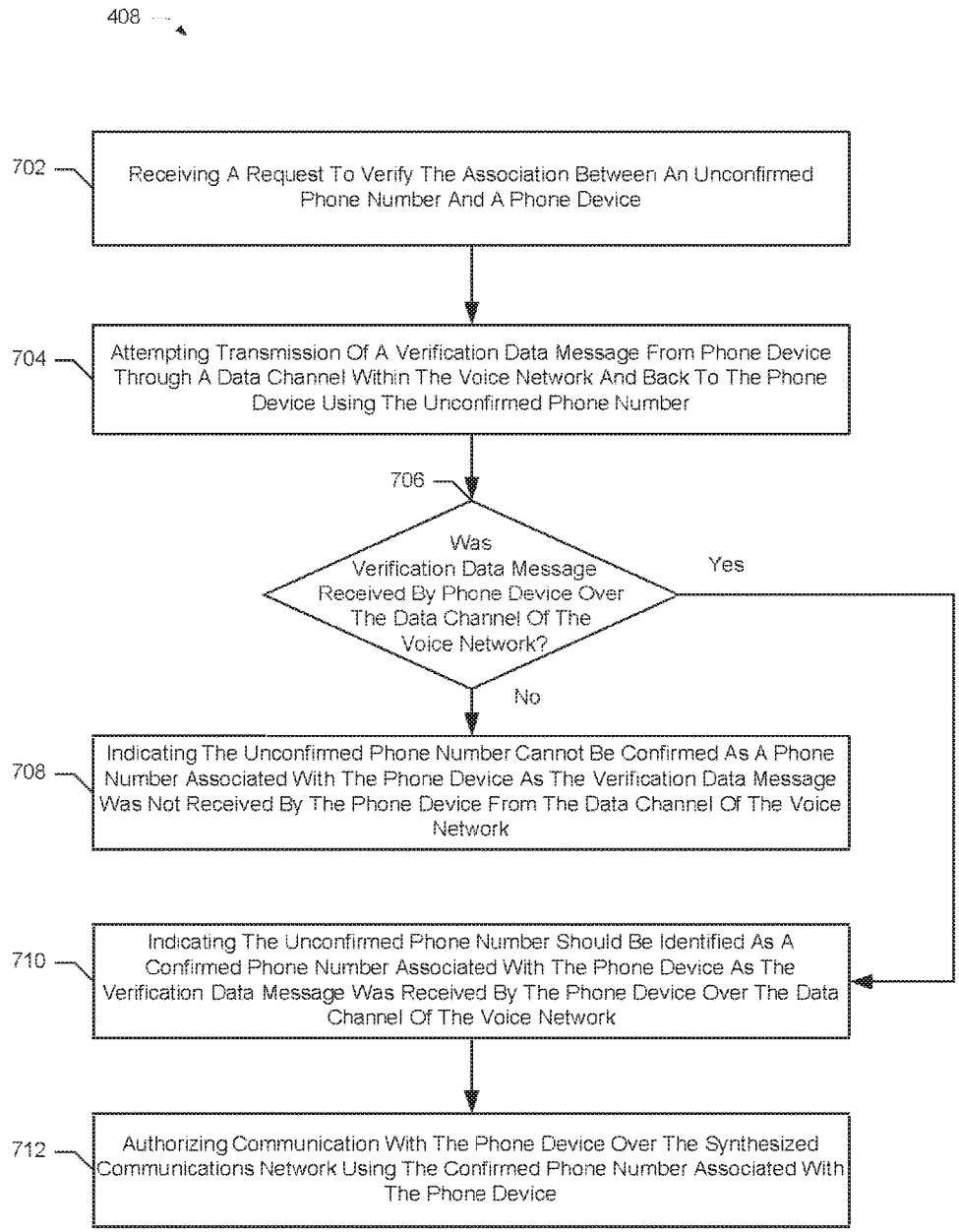
FIG. 7 is a flowchart representation of the operations for registering a phone device on the synthetic communication network in accordance with aspects of the present invention.

FIG. 7 is a flowchart representation of the operations for verifying a phone number is associated with a phone device on the synthetic communication network in accordance with aspects of the present invention. One implementation of the method receives a request to verify that a phone number is associated with a phone device registered on a voice network. As previously described, the phone device may be a wireless phone as well as any other device that is assigned a phone number on the voice network. To begin, the phone number associated with the phone device on the preexisting voice network is presumed to be an unconfirmed phone number (702). Phone numbers on the voice network are provisioned and managed on the voice network by wireless phone providers and other phone companies but reused on the synthetic communication network of the present invention. It is therefore necessary for the synthesized communication network to independently verify the association of a phone number with a phone device before it can be reliably reused on the synthetic communication network.

Accordingly, one implementation of the present invention attempts transmission of a verification data message from the phone device through a data channel within the voice network and back to the phone device using the unconfirmed phone number (704). In one implementation, the data channel of the voice network allows the verification data message to be up to 140 characters using a short messaging service (SMS). A synthetic communication client executing on the phone device may randomly generate the verification data message up to this character limit and prepare to send it over the data channel using the phone number presumed associated with the phone device. For example, the SMS message may address the phone device using the presumed phone number and include the randomly generated message for verification purposes.

Next, aspects of the present invention determine if the verification message was subsequently received by the phone device over the voice network (706). One embodiment of the present invention uses the synthetic communication client executing on the phone device to compare the original outbound verification data message with the returning verification data message. If the verification data message returned to the synthetic communication client matches then aspects of the present invention have independently verified and confirmed that the phone number is associated with the phone device as presumed (706-Yes). For example, the verification data message may be include randomly generated 3-digit value sent out as an SMS message that loops back and returns to the synthetic communication client executing on the phone device. The synthetic communication client verifies the phone number of the phone device when the 3-digit value received by the synthetic communication client of the present invention matches the 3-digit value sent out.

Once confirmed, aspects of the present invention indicate the unconfirmed phone number should be identified as a confirmed phone number associated with the phone device (710). The confirmed phone number can be used reliably on the synthetic communication network as the phone number has been successfully and independently verified. Repeated verification may be performed at regular intervals to make sure the phone number has not been disconnected, abandoned or reassigned to a different phone device over time. In general, verification ensures that the phone devices will be able to communicate with each other on the synthetic communication network as expected.

If the phone number can be confirmed then aspects of the present invention authorizes communication with the phone device over the synthesized communications network using the confirmed phone number (712). Alternatively, if the predetermined data message returned to the synthetic communication client does not match (706-No) then aspects of the present invention indicate that the unconfirmed phone number cannot be confirmed and used as a phone number associated with the phone device and the phone number are not registered (708).

Figure 8:
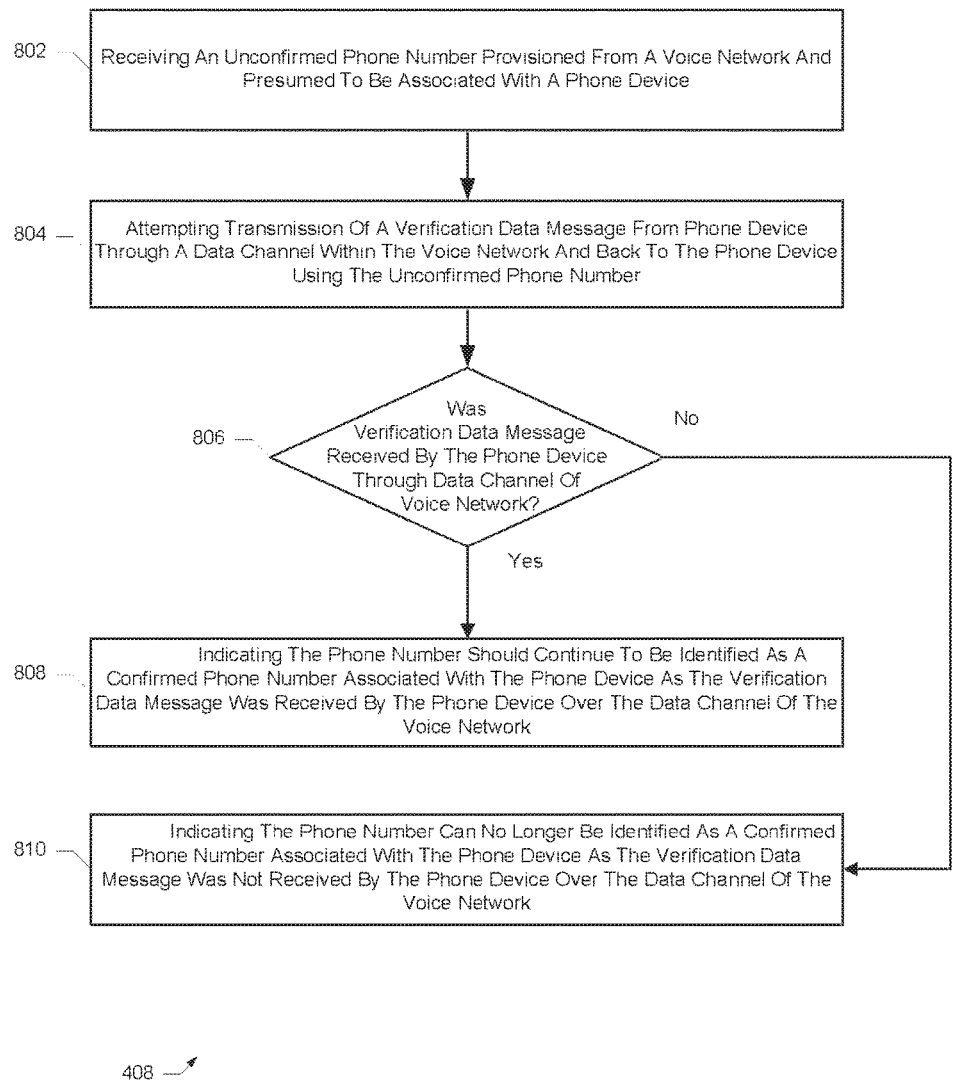
FIG. 8 is a flowchart representation of the operations for independently confirming the association of a phone number and a phone device on the synthetic communication network in accordance with aspects of the present invention.

FIG. 8 is a flowchart representation of the operations for independently confirming the association of a phone number and a phone device on the synthetic communication network in accordance with aspects of the present invention. This aspect of the invention may be used to check whether the phone number of a phone device has changed over a period of time. For example, it may be necessary to reconfirm whether a phone number previously added to the synthetic communication network is still associated with a particular phone device or has been cancelled and transferred elsewhere. Indeed, it is possible that a phone number may be reassigned to another phone device without notice as the phone numbers are provisioned from the voice network and not the synthetic communication network of the present invention.

Aspects of the present invention receive an unconfirmed phone number provisioned from a voice network and presumed to be associated with a phone device (802). The phone device may be a wireless phone as well as any other device that is assigned a phone number on the voice network. It is necessary for the synthesized communication network to independently verify the association of the phone number on the phone device before it can be reliably reused for the synthetic communication network. This is at least because phone numbers are provisioned and managed on the voice network but reused on the synthetic communication network of the present invention.

Accordingly, one implementation of the present invention attempts transmission of a verification message from the phone device through a data channel within the voice network and back to the phone device using the unconfirmed phone number (804). In one implementation, the data channel of the voice network allows the verification message to be up to 140 characters using a short messaging service (SMS). A synthetic communication client executing on the phone device randomly generates the verification message up to this character limit and prepares to send over the data channel using the phone number presumed associated with the phone device. For example, the SMS message may address the phone device using the phone number presumed to be associated with the phone device and include the randomly generated verification message for subsequent comparison.

Next, aspects of the present invention determine if the predetermined message was subsequently received by the phone device over the voice network (806). One embodiment of the present invention uses the synthetic communication client executing on the phone device to compare the original outbound verification message with the returning message. If the message returned to the synthetic communication client matches the verification message then aspects of the present invention have independently verified and confirmed that the phone number is associated with the phone device as alleged (806-Yes). For example, the verification message may be a randomly generated 3-digit value sent in an SMS message that loops back and returns to the synthetic communication client executing on the phone device. Essentially, the confirmed phone number can continue to be used reliably on the new synthetic communication network as the phone number has been successfully and independently re-verified. This ensures that the phone devices are able to communicate with each other over the synthetic communication network as expected.

Once confirmed, aspects of the present invention indicate that the phone number should continue to be identified as a confirmed phone number associated with the phone device (808). Repeated verification may be performed at regular intervals to make sure the phone number has not been disconnected, abandoned or reassigned to a different phone device over time.

Alternatively, if the verification message returned to the synthetic communication client does not match (806-No) then aspects of the present invention indicates that the unconfirmed phone number should no longer be used as a phone number associated with the phone device on the synthetic network in accordance with the present invention (810).

Figure 9:
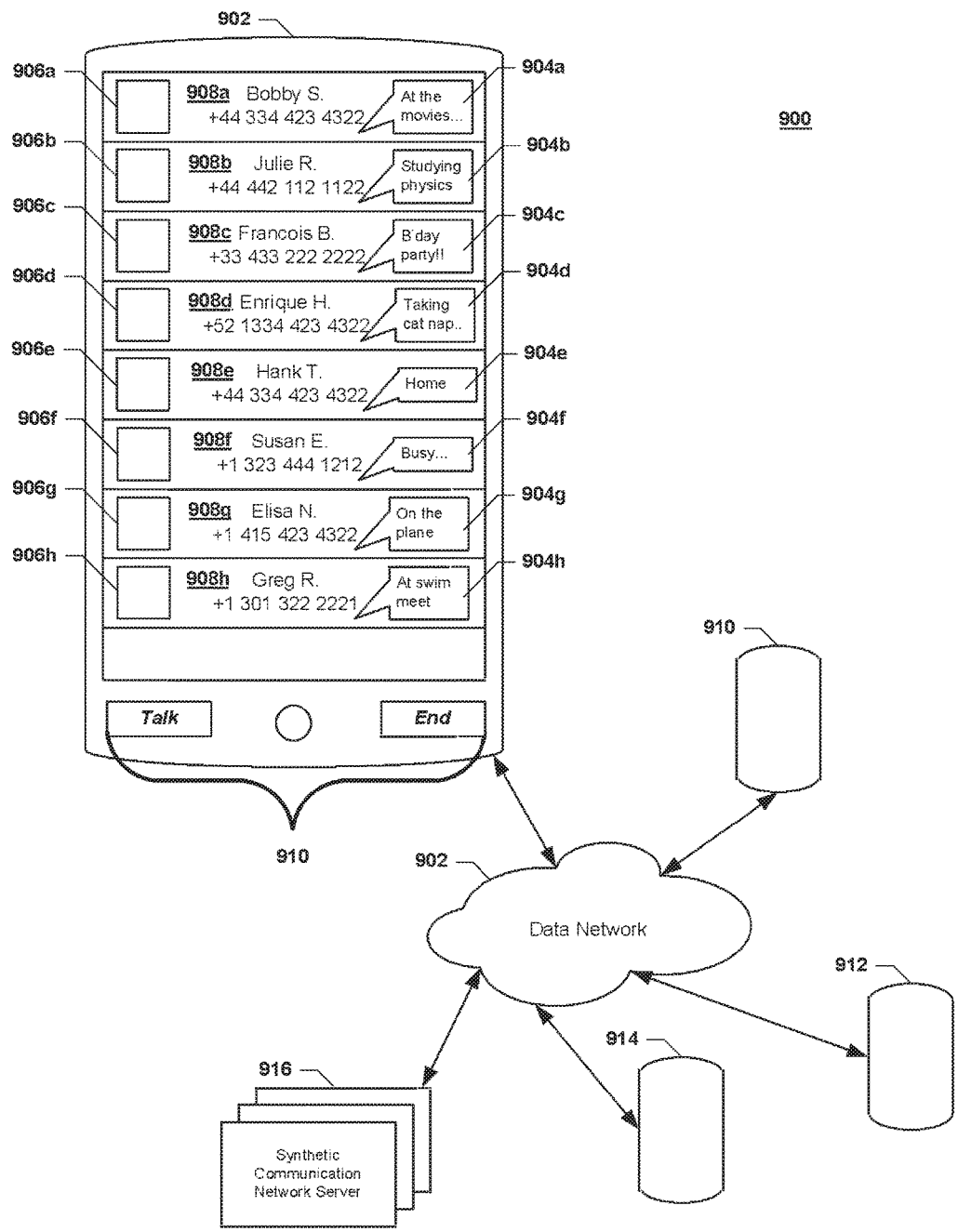
FIG. 9 illustrates a phone device communicating over a synthetic communication network in accordance with aspects of the present invention.

FIG. 9 illustrates a phone device displaying a graphical user interface (GUI) communicating over a synthetic communication network in accordance with aspects of the present invention. In this example, the synthetic communication network 900 includes a detailed view of phone device 902 displaying status of various phone devices and connectivity to some of the other phone devices 910, 912, 914 over a data network 902. Synthetic communication server 916 facilitates communication between phone devices 902, 910, 912 and 914 on the synthetic communication network 900 as well as ensuring status on the phone devices illustrated on phone device 902 is kept updated.

One implementation of the present invention consistent with the GUI of phone device 902 depicts a set of normalized phone numbers being monitored. A status list on the synthetic communication client tracks the status of phone devices and displays the status as indicated by status 904*a-h*. For example, a user may set the status to indicate a specific activity illustrated in status 904*b* such as "Studying physics" or may indicate a general status such as status 904*f* indicating "Busy . . . ". Status on the synthetic communication is flexible and can be set to anything the user wants to indicate.

These normalized phone numbers 908*a-h* also show a user name (First Name Last Initial) and the normalized phone number formatted with both an international dialing prefix and country code. The synthetic communication client of the present invention may be used to manage and display these users and their normalized phone numbers once they are synchronized in accordance with aspects of the present invention as previously described. Additional information may include a corresponding icon or photo 906a-906h chosen by the phone device being monitored.

Figure 10:
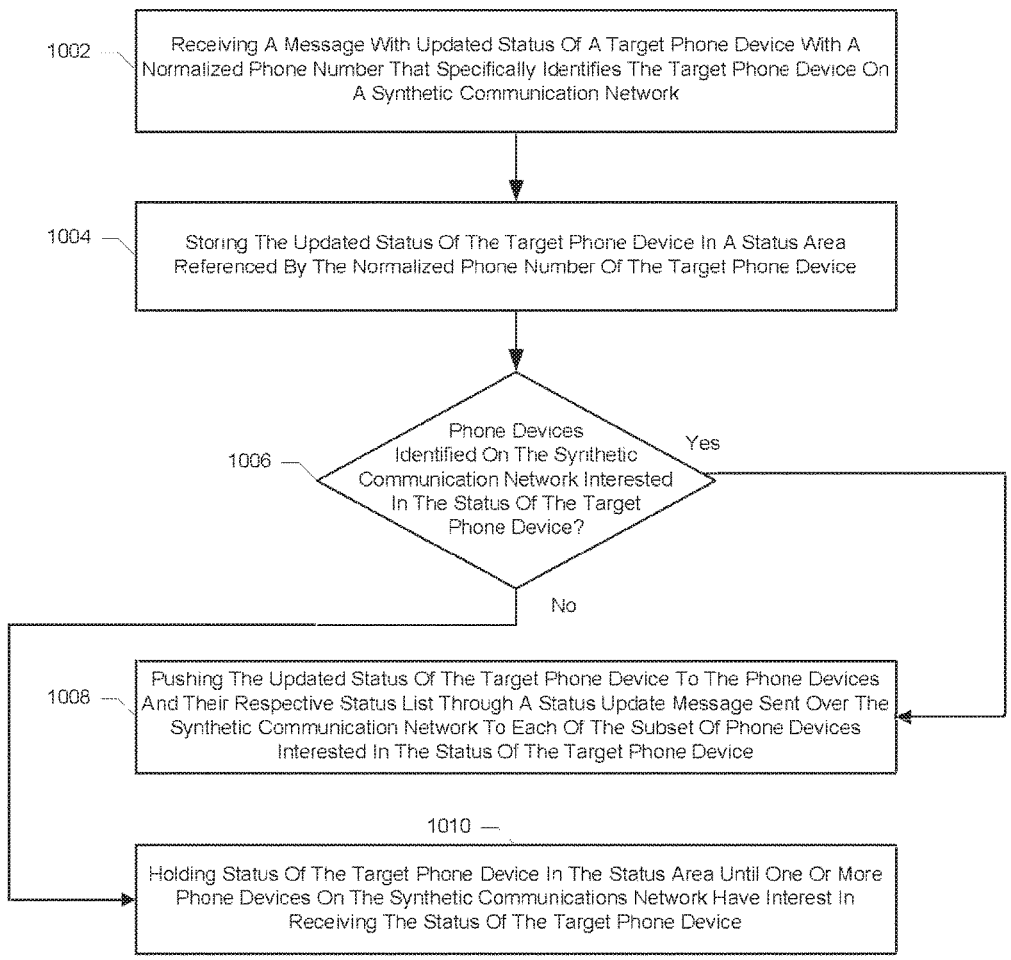
FIG. 10 is a flowchart diagram of the operations associated with processing the status of one or more phone devices in accordance with aspects of the present invention.

FIG. 10 is a flowchart diagram of the operations associated with processing the status of one or more phone devices in accordance with aspects of the present invention. Status associated with the one or more phone devices may be centrally processed on a synthetic communication server operatively connected to the one or more phone devices over a synthetic communication network of the present invention.

In one implementation, a synthetic communication server receives a message with a normalized phone number identifying a target phone device and updated status of the target phone device on a synthetic communication network (1002). Status may indicate that the user of the phone device is currently busy, on a plane, that the phone has actually been turned off or any status message the user of the phone device wishes to provide. Generally, the user enters status information on a synthetic communication client executing on the target phone device. The synthetic communication client transmits the updated status of the phone device by sending a status message over the synthetic communication network to the synthetic communication server.

Aspects of the present invention store the updated status of the target phone device in a status area referenced by the normalized phone number of the target phone device (1004). Entries in the status area also hold the current status of each phone device on the synthetic communication network along with their corresponding normalized phone numbers. Next, the synthetic communication server of the present invention determines if a subset of phone devices from a set of one or more other phone devices on the synthetic communication network is interested in the status of the target phone device (1006). To make this determination, the synthetic communication server downloads a status list from each phone device listing the phone devices to be monitored. The server compares the normalized phone number of the target phone device against normalized phone numbers in the status list from each of the phone devices. Matches from these comparisons determine the subset of phone devices interested in the status of the target phone device.

If the target phone device is being monitored then aspects of the present invention push the updated status of the target phone device to the subset of phone devices and the status list on each phone device (1008). For example, the updated status may be sent to each phone device in the subset through a status update message sent over the synthetic communication network. Individual phone devices process the status updates for target phone device and other phone devices then display the results in a GUI such as the one depicted in FIG. 9 on phone device 902. Alternatively, it is possible that the target phone device is not currently being monitored by other phone devices. If the target phone device is not monitored then the server may hold status of the target phone device in the status area until one or more phone devices on the synthetic communications network have interest in receiving such status (1010). Keeping status on a central server allows the status for the target phone device to be made available even when the target phone device has no connection through a voice network or has been turned off entirely. It also is advantageous as the status or state of the target phone device is preserved and not lost even when no phone device is immediately interested in monitor the status of the target phone device.

Figure 11:
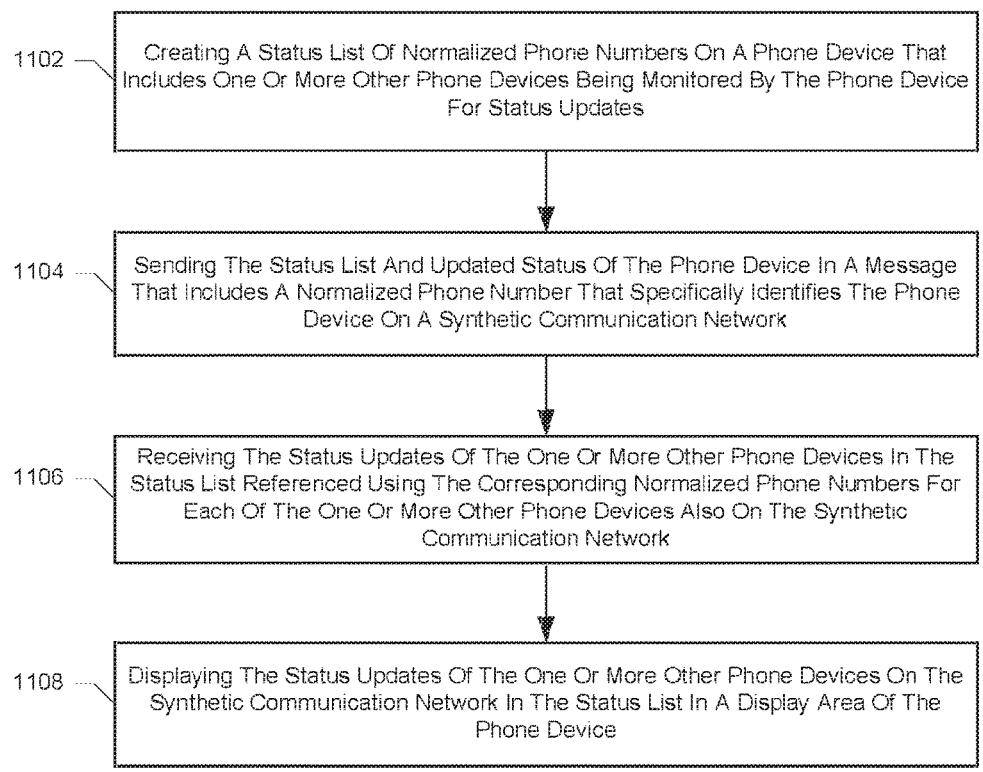
FIG. 11 is another flowchart diagram of the operations for updating status of a phone device and receiving status on other phone devices in accordance with aspects of the present invention.

FIG. 11 is another flowchart diagram of the operations for updating status of a phone device and receiving status on other phone devices in accordance with aspects of the present invention. One aspect of the invention may be processed on a synthetic communication client running on the phone device as illustrated in FIG. 9 as phone device 902. Generally, each phone device creates a status list of normalized phone numbers listing other phone devices being monitored for status updates (1102). In one implementation, the status list of normalized phone numbers is managed through the synthetic communication client executing on the phone device. Users may enter phone devices on the status lists manually or may update the status list by synchronizing with the phone numbers in their phone directory. On the phone device, the status list may hold the most recent status of the other phone devices on the synthetic communication network in addition to corresponding normalized phone numbers and other related information.

The phone device generally sends the status list and an updated status of the individual phone device in a message that includes a normalized phone number that specifically identifies the phone device on the synthetic communication network (1104). For example, a phone device may send the status list of normalized phone numbers in response to a request for the status list from a synthetic communication server. The synthetic communication server receives the updated status of the phone device and updates the appropriate entry in the status area of the synthetic communication server. In addition, the synthetic communication server may also receive the status list of other phone devices being monitored by the phone device.

Next, aspects of the present invention receive the status updates of the other phone devices in the status list referenced using the corresponding normalized phone numbers for each of the other phone devices (1108). In one implementation, the synthetic communication client running on the phone device updates the status list with the status updates of the other phone devices. The phone device may then display the status updates of the one or more other phone devices on the synthetic communication network in a display area of the phone device (1108). One implementation of the present invention may display the status of other phone devices as illustrated in accordance with FIG. 9 and phone device 902. However, it is contemplated that many other interfaces could be developed to provide status of the other phone devices on the synthetic communication network of the present invention using graphical elements on a GUI, text elements, sound or voice.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read only memory and/or a random access memory. Generally, a computer will include one or more mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs.

While specific embodiments have been described herein for purposes of illustration, various modifications may be made without departing from the spirit and scope of the invention. For example, a predetermined data message containing text characters can be sent over a data channel portion of the voice network as a verification message for a phone number and phone device. However, alternate methods of confirming a phone number may include sending a voice message to a phone number and then verifying the receipt of the voice message on the phone device with a return voice message. Accordingly, the invention is not limited to the above-described implementations, but instead is defined by the appended claims in light of their full scope of equivalents.

What is claimed is:

1. A method, comprising the steps of:
receiving, by a synthetic communication server over a synthetic communication network, a message that is automatically transmitted from a target phone device when the status of the target phone device changes from a first status to a new status, the message including the new status of the target phone number and identifying the target phone device on the synthetic communication network using a normalized phone number of the target phone device that uniquely identifies the target phone on the synthetic communication network and has previously been confirmed to be associated with the first phone device as a result of receipt at the first phone device of a first verification message transmitted by the first phone device and addressed to the first phone number;
responsive to receiving the message, storing, by the synthetic communication server, an indication of the new status of the target phone device in a status area referenced by the normalized phone number of the target phone device;
identifying, by the synthetic communication server, a subset of phone devices from a set of other phone devices on the synthetic communication network that are interested in the status of the target phone device; and
pushing the new status of the target phone device to a status list area for each phone device in the subset.

2. The method of claim 1, wherein the message with new status is received from a synthetic communication client executing on the target phone device.

3. The method of claim 1, wherein the status list area further holds the status of a set of one or more other phone devices identified on the synthetic communication network by a corresponding set of normalized phone numbers.

4. The method of claim 3, wherein the status list area comprises a graphical user interface.

5. The method of claim 4, wherein the status list area includes at least one graphical element selected from the group including icons identifying the corresponding other phone devices and photographs identifying the users of the other phone devices.

6. The method of claim 4, wherein the status list in the status list display area includes audiovisual content.

7. The method of claim 1, wherein identifying the subset of phone devices that are interested in the status of the target phone device occurs through a comparison of the normalized phone number of the target phone device against a status list of normalized phone numbers from each of the phone devices in the subset.

8. The method of claim 1, wherein the synthetic communication network may be used to transmit text messages combined with at least one other multimedia data type selected from a set of multimedia data types including images, video, voice, music and data files.

9. The method of claim 1, wherein the target phone device and the other phone devices are selected from a set of devices having a phone number including: a wireless phone, a wireless tablet computer, a wireless laptop and a wireless modem device.

10. The method of claim 1, wherein the new status of the target phone device is entered by a user of the target phone device on a synthetic communication client executing on the target phone device prior to the message being automatically transmitted from the target phone device.

11. The method of claim 1, further comprising:
receiving, by the synthetic communication server and while the target phone device is not connected to the synthetic communication network, an indication that an additional phone device in the set of other phone devices on the synthetic communication network is interested in the status of the target phone device; and
responsive to the received indication, pushing, by the synthetic communication server, the new status of the target phone device to a status list are for the additional phone device.

12. A computer program product stored on a non-transitory computer readable medium and including program code that, when executed by a processor, causes the processor to execute steps comprising:
receiving over a synthetic communication network, a message that is automatically transmitted from a target phone device when the status of the target phone device changes from a first status to a new status, the message including the new status of the target phone number and identifying the target phone device on the synthetic communication network using a normalized phone number of the target phone device that uniquely identifies the target phone on the synthetic communication network and has previously been confirmed to be associated with the first phone device as a result of receipt at the first phone device of a first verification message transmitted by the first phone device and addressed to the first phone number;
responsive to receiving the message, storing an indication of the new status of the target phone device in a status area referenced by the normalized phone number of the target phone device;
identifying a subset of phone devices from a set of other phone devices on the synthetic communication network that are interested in the status of the target phone device; and
pushing the new status of the target phone device to a status list area for each phone device in the subset.

13. The computer program product of claim 12, wherein the new status of the target phone device is entered by a user of the target phone device on a synthetic communication client executing on the target phone device prior to the message being automatically transmitted from the target phone device.

14. The computer program product of claim 12, further comprising:
   receiving, by the synthetic communication server and while the target phone device is not connected to the synthetic communication network, an indication that an additional phone device in the set of other phone devices on the synthetic communication network is interested in the status of the target phone device; and
   responsive to the received indication, pushing, by the synthetic communication server, the new status of the target phone device to a status list are for the additional phone device.

15. The computer program product of claim 12, wherein the status list area further holds the status of a set of one or more other phone devices identified on the synthetic communication network by a corresponding set of normalized phone numbers.

16. The method of claim 15, wherein the status list area comprises a graphical user interface.

17. The computer program product of claim 16, wherein the status list area includes at least one graphical element selected from the group including icons identifying the corresponding other phone devices and photographs identifying the users of the other phone devices.

* * * * *